United States Patent
Ouyang

(10) Patent No.: US 11,055,100 B2
(45) Date of Patent: Jul. 6, 2021

(54) PROCESSOR, AND METHOD FOR PROCESSING INFORMATION APPLIED TO PROCESSOR

(71) Applicant: Beijing Baidu Netcom Science and Technology Co., Ltd., Beijing (CN)

(72) Inventor: Jian Ouyang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/502,628

(22) Filed: Jul. 3, 2019

(65) Prior Publication Data
US 2020/0050456 A1    Feb. 13, 2020

(30) Foreign Application Priority Data

Aug. 10, 2018   (CN) .......................... 201810907909.3

(51) Int. Cl.
| | | |
|---|---|---|
| *G06F 9/38* | (2018.01) | |
| *G06F 9/54* | (2006.01) | |
| *G06F 9/30* | (2018.01) | |
| *G06F 7/57* | (2006.01) | |

(52) U.S. Cl.
CPC ........ *G06F 9/3826* (2013.01); *G06F 9/30141* (2013.01); *G06F 9/546* (2013.01); *G06F 7/57* (2013.01)

(58) Field of Classification Search
CPC .................................................. G06F 9/3826
See application file for complete search history.

(56) References Cited

U.S. PATENT DOCUMENTS

| | | | |
|---|---|---|---|
| 6,668,316 B1 | 12/2003 | Gorshtein et al. | |
| 7,062,635 B2 * | 6/2006 | Bosshart ............... | G06F 9/3001 712/218 |
| 7,350,056 B2 | 3/2008 | Abernathy et al. | |
| 2002/0108026 A1 * | 8/2002 | Balmer ................. | G06F 9/3885 712/218 |

(Continued)

FOREIGN PATENT DOCUMENTS

| | | |
|---|---|---|
| CN | 1382280 A | 11/2002 |
| CN | 105204820 A | 12/2005 |

(Continued)

OTHER PUBLICATIONS

ALU (Research on Optimal Design of High Performance ALU), Jan. 15, 2010, 60 pages. (English-language Abstract).

*Primary Examiner* — Michael J Metzger
(74) *Attorney, Agent, or Firm* — The Webb Law Firm

(57) ABSTRACT

Embodiments of the present disclosure relate to a method for processing information, and a processor. The processor includes an arithmetic and logic unit, a bypass unit, a queue unit, a multiplexer, and a register file. The bypass unit includes a data processing subunit; the data processing subunit is configured to acquire at least one valid processing result outputted by the arithmetic and logic unit, determine a processing result from the at least one valid processing result, output the determined processing result to the multiplexer, and output processing results except for the determined processing result of among the at least one valid processing result to the queue unit; and the multiplexer is configured to sequentially output more than one valid processing results to the register file.

15 Claims, 4 Drawing Sheets

(56) References Cited

U.S. PATENT DOCUMENTS

| | | | |
|---|---|---|---|
| 2005/0015576 A1* | 1/2005 | Dhong | G06F 9/30036 |
| | | | 712/221 |
| 2008/0109635 A1* | 5/2008 | Shih | G06F 9/3001 |
| | | | 712/11 |
| 2013/0159666 A1* | 6/2013 | Boersma | G06F 15/76 |
| | | | 712/7 |
| 2015/0039862 A1* | 2/2015 | Barowski | G06F 9/3826 |
| | | | 712/218 |
| 2017/0139710 A1 | 5/2017 | Zbiciak | |
| 2017/0308381 A1 | 10/2017 | Zbiciak | |

FOREIGN PATENT DOCUMENTS

| | | |
|---|---|---|
| CN | 1940862 A | 4/2007 |
| CN | 101799795 A | 8/2010 |
| CN | 102866957 A | 1/2013 |
| CN | 108255777 A | 7/2018 |
| JP | 2002318689 A | 10/2002 |
| JP | 2010218076 A | 9/2010 |

* cited by examiner

PROCESSOR, AND METHOD FOR PROCESSING INFORMATION APPLIED TO PROCESSOR

CROSS-REFERENCE TO RELATED APPLICATION

This application claims priority to Chinese Patent Application No. 201810907909.3 filed Aug. 10, 2018, the disclosure of which is hereby incorporated by reference in its entirety.

TECHNICAL FIELD

Embodiments of the present disclosure relate to the field of computer technology, specifically to the field of Internet technology, and more specifically to a method for processing information, and a processor.

BACKGROUND

During data processing by a processor, processing results of an arithmetic and logic unit are generally written into a first in first out queue for caching. Writing the processing results often needs to consume a certain length of time, while subsequently reading the processing results also needs to spend a long time, thereby affecting the efficiency of program execution.

SUMMARY

Embodiments of the present disclosure present a method for processing information, and a processor.

In a first aspect, an embodiment of the present disclosure provides a processor. The processor includes an arithmetic and logic unit, a bypass unit, a queue unit, a multiplexer, and a register file. The bypass unit includes a data processing subunit. The data processing subunit is configured to acquire at least one valid processing result outputted by the arithmetic and logic unit, determine a processing result from the at least one valid processing result, output the determined processing result to the multiplexer, and output processing results except for the determined processing result among the at least one valid processing result to the queue unit, where the processing result includes an enable signal, and the valid processing result includes a high-level enable signal or a low-level enable signal; and the multiplexer is configured to sequentially output more than one valid processing results to the register file, where the more than one valid processing results include the determined processing result and a valid processing result outputted from the queue unit.

In some embodiments, the bypass unit further includes a bypass outputting subunit, and the data processing subunit includes a number determining module and a multiple-input processing module. The number determining module is configured to determine a number of valid processing results among at least two processing results outputted by the arithmetic and logic unit within a clock cycle, and output the at least two processing results to the multiple-input processing module if determining that the number is more than two; and the multiple-input processing module is configured to, based on preset priority, determine at least two valid processing results from the at least two processing results, determine a processing result with a highest priority from the at least two valid processing results, and output the processing result with the highest priority to the bypass outputting subunit.

In some embodiments, the data processing subunit further includes a single-input processing module. The number determining module is further configured to output the at least two processing results to the single-input processing module if determining that the number is one; and the single-input processing module is configured to determine a valid processing result from the at least two processing results, and output the valid processing result to the bypass outputting subunit.

In some embodiments, the bypass unit further includes a main outputting subunit, and the queue unit includes a first in first out queue unit. The multiple-input processing module is further configured to output other processing results except for the processing result with the highest priority among the at least two valid processing results to the main outputting subunit; the main outputting subunit is configured to output the other processing results to the first in first out queue unit; and the first in first out queue unit is configured to cache the other processing results, and output the other processing results to the multiplexer.

In some embodiments, the multiplexer is further configured to sequentially output processing results outputted by the first in first out queue units and processing results outputted by the bypass outputting subunit to the register file, where a processing result outputted by the bypass outputting subunit from the multiplexer has a highest priority, and processing results outputted by different first in first out queue units from the multiplexer have different priorities.

In some embodiments, the number determining module is further configured to accumulatively add first level enable signals in the at least two processing results using an adder to obtain a number of first level enable signals, and determine a number of valid processing results based on the number of first level enable signals, where the first level is a high level or a low level.

In some embodiments, the single-input processing module and the multiple-input processing module include a multiple-stage multiplexer, and the multiple-stage multiplexer is configured to determine a valid processing result from the at least two processing results.

In a second aspect, an embodiment of the present disclosure provides a chip, including the processor according to any one of the above embodiments.

In a third aspect, an embodiment of the present disclosure provides a method for processing information applied to a processor. The processor includes an arithmetic and logic unit, a bypass unit, a queue unit, a multiplexer, and a register file. The bypass unit includes a data processing subunit. The method includes: acquiring, by the data processing subunit, at least one valid processing result outputted by the arithmetic and logic unit, determining a processing result from the at least one valid processing result, outputting the determined processing result to the multiplexer, and outputting processing results except for the determined processing result among the at least one valid processing result to the queue unit, where the processing result includes an enable signal, and the valid processing result includes a high-level enable signal or a low-level enable signal; and sequentially outputting, by the multiplexer, more than one valid processing results to the register file, where the more than one valid processing results include the determined processing result and a valid processing result outputted from the queue unit.

In some embodiments, the bypass unit further includes a bypass outputting subunit, and the data processing subunit includes a number determining module and a multiple-input processing module; and the acquiring at least one valid processing result outputted by the arithmetic and logic unit, and determining a processing result from the at least one valid processing result includes: determining, by the number determining module, a number of valid processing results of at least two processing results outputted by the arithmetic and logic unit within a clock cycle, and outputting the at least two processing results to the multiple-input processing module if determining that the number is more than two; and determining, by the multiple-input processing module, based on preset priority, at least two valid processing results from the at least two processing results, determining a processing result with a highest priority from the at least two valid processing results, and outputting the processing result with the highest priority to the bypass outputting subunit.

In some embodiments, the data processing subunit further includes a single-input processing module; and the acquiring at least one valid processing result outputted by the arithmetic and logic unit, and determining a processing result from the at least one valid processing result further includes: outputting, by the number determining module, the at least two processing results to the single-input processing module if determining that the number is one; and determining, by the single-input processing module, a valid processing result from the at least two processing results, and outputting the valid processing result to the bypass outputting subunit.

In some embodiments, the bypass unit further includes a main outputting subunit, and the queue unit includes a first in first out queue unit. The method further includes: outputting, by the multiple-input processing module, other processing results except for the processing result with the highest priority of the at least two valid processing results to the main outputting subunit; outputting, by the main outputting subunit, the other processing results to the first in first out queue unit; and caching, by the first in first out queue unit, the other processing results, and outputting the other processing results to the multiplexer.

In some embodiments, the sequentially outputting more than one valid processing results to the register file includes: sequentially outputting, by the multiplexer, processing results outputted by the first in first out queue units and processing results outputted by the bypass outputting subunit to the register file, where a processing result outputted by the bypass outputting subunit from the multiplexer has a highest priority, and the processing results outputted by different first in first out queue units from the multiplexer have different priorities.

In some embodiments, the determining a number of valid processing results among at least two processing results outputted by the arithmetic and logic unit within a clock cycle includes: accumulatively adding, by the number determining module, first level enable signals in the at least two processing results using an adder to obtain a number of first level enable signals, and determining a number of valid processing results based on the number of first level enable signals, where the first level is a high level or a low level.

In some embodiments, the single-input processing module and the multiple-input processing module include a multiple-stage multiplexer, and the multiple-stage multiplexer is configured to determine a valid processing result from the at least two processing results.

In a fourth aspect, an embodiment of the present disclosure provides an electronic device, including: one or more processors; and a storage apparatus, configured to store one or more programs, where the one or more programs, when executed by the one or more processors, cause the one or more processors to implement the method of any one embodiment of the method for information processing for a processor.

In a fifth aspect, an embodiment of the present disclosure provides a computer readable storage medium, storing a computer program thereon, where the program, when executed by a processor, implements the method of any one embodiment of the method for information processing for a processor.

In a solution of a processor provided in the embodiments of the present disclosure, the processor includes an arithmetic and logic unit, a bypass unit, a queue unit, a multiplexer, and a register file. The bypass unit includes a data processing subunit. In the solution, the data processing subunit is configured to acquire at least one valid processing result outputted by the arithmetic and logic unit, determine a processing result from the at least one valid processing result, output the determined processing result to the multiplexer, and output processing results except for the determined processing result among the at least one valid processing result to the queue unit. The processing result includes an enable signal, and the valid processing result includes a high-level enable signal or a low-level enable signal. The multiplexer is configured to sequentially output more than one valid processing results to the register file, where the more than one valid processing results include the determined processing result and a valid processing result outputted from the queue unit. The embodiments of the present disclosure may reduce the caching process of processing results in the processor, and improve the processing efficiency of the processor by using the bypass unit. Moreover, the bypass unit is used to select a valid processing result, and reduce interference by invalid processing results, to facilitate subsequent utilization of the processing result.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
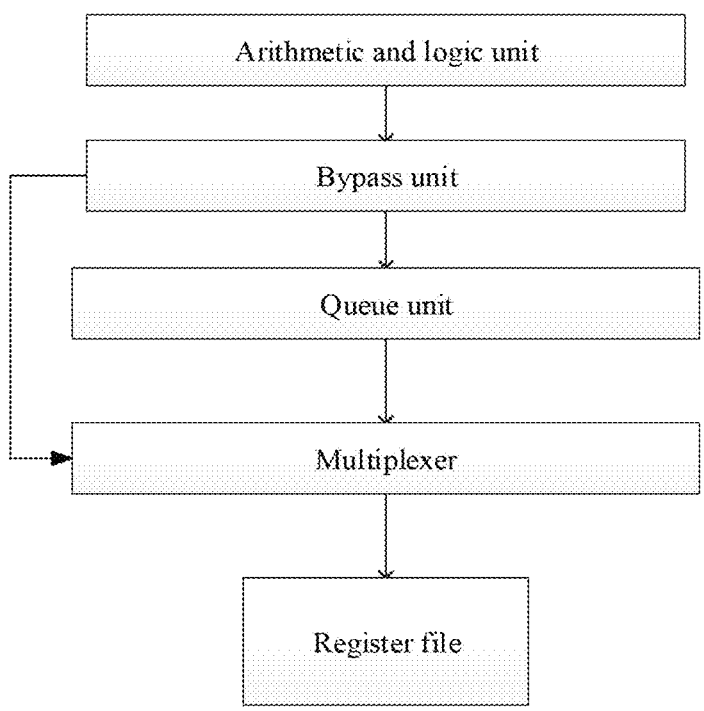
FIG. 1 is a schematic structural diagram of an embodiment of a processor according to the present disclosure.

Referring to FIG. 1, an embodiment of a processor according to the present disclosure is shown. The processor includes an arithmetic and logic unit (ALU), a bypass unit, a queue unit, a multiplexer (MUX), and a register file. The bypass unit includes a data processing subunit.

The data processing subunit is configured to acquire at least one valid processing result outputted by the arithmetic and logic unit, determine a processing result from the at least one valid processing result, output the determined processing result to the multiplexer, and output processing results except for the determined processing result among the at least one valid processing result to the queue unit. The processing result includes an enable signal, and the valid processing result includes a high-level enable signal or a low-level enable signal.

In the present embodiment, the data processing subunit in the bypass unit is configured to acquire one or more than two valid processing results outputted by the arithmetic and logic unit, and may determine a processing result therefrom, and output the determined processing result to the multiplexer. When the number of processing results is more than one, and after receiving processing results expect for the determined processing result, the queue unit outputs the processing results to the multiplexer in accordance with a preset rule of outputting sequence (such as first in first out).

Here, the data processing subunit outputting the processing result to the multiplexer may directly output the processing result to the multiplexer, or forward the processing result to the multiplexer via a relay node, for example, may output the processing result by a subunit for outputting. Here, the acquired valid processing result may be directly acquired locally or from the arithmetic and logic unit, or acquired by selection or the like based on the level.

The processing result includes an enable signal. The enable signal is used to indicate whether the processing result is valid. The valid processing result outputted from the arithmetic and logic unit may be a high-level enable signal or a low-level enable signal. Moreover, the processing result further includes data obtained by the arithmetic and logic unit from computation.

In practice, a processing result may be determined using various approaches. For example, a processing result with earlier generation time may be selected, or a processing result with a preset highest priority may be selected. For example, a priority may be preset for each arithmetic and logic unit, and a processing result outputted from an arithmetic and logic unit with a highest priority may be used as the processing result with the highest priority.

It should be noted that the arithmetic and logic unit may be a stand-alone arithmetic and logic unit, or a set of a plurality of arithmetic and logic units. The queue unit may be a stand-alone queue unit, or a set of a plurality of queue units. For example, if the queue unit is a first in first out queue unit, then the queue unit may include a plurality of first in first out queue units.

The multiplexer is configured to sequentially output more than one valid processing results to the register file, where the more than one valid processing results include the determined processing result and a valid processing result outputted from the queue unit.

In the present embodiment, the multiplexer may select a processing result from the more than one valid processing results, and output the selected processing result to the register file. The more than one processing results may include the above determined processing result directly inputted into the multiplexer from the bypass unit. In addition, the more than one processing results may further include a processing result obtained using other approaches except for the directly inputting from the bypass unit. For example, the more than one processing results may include a valid processing result inputted into the multiplexer from the queue unit of the processor. For example, the queue unit here may be a first in first out queue unit, or a last in first out queue unit.

Specifically, the multiplexer may select a processing result using various approaches. For example, a processing result with earlier generation time may be selected, or a processing result with a highest priority may be selected. When the processing result is selected based on priority, a priority order of units outputting valid processing results to the multiplexer may be preset. Then, a processing result with the highest priority is selected based on priority of the outputting unit of the processing result.

It should be noted that the processor of the present disclosure may be applied to various chips.

The present embodiment may reduce the caching process of processing results in the processor, and improve the processing efficiency of the processor by using the bypass unit. Moreover, the bypass unit is used to select a valid processing result, and reduce interference by invalid processing results, to facilitate subsequent utilization of the processing result.

Further, as an implementation of the method shown in the above figures, the present disclosure presents another embodiment of the processor. The bypass unit of the processor further includes a bypass outputting subunit, and the data processing subunit includes a number determining module and a multiple-input processing module.

The number determining module is configured to determine a number of valid processing results among at least two processing results outputted by the arithmetic and logic unit within a clock cycle, and output at least two processing results to the multiple-input processing module if determining that the number is more than two.

In the present embodiment, the number determining module may determine the number of valid processing results among the at least two processing results outputted by the arithmetic and logic unit within a clock cycle. The number determining module outputs the at least two processing results to the multiple-input processing module if determining that the number of valid processing results is greater than or equal to two. Specifically, when the valid processing results are high-level processing results, the number determining module may determine the number of high-level processing results. Specifically, when the valid processing results are low-level processing results, the number determining module determines the number of low-level processing results.

The multiple-input processing module is configured to determine at least two valid processing results from the at least two processing results, determine a processing result with a highest priority from the at least two valid processing results based on preset priority, and output the processing result with the highest priority to the bypass outputting subunit.

In the present embodiment, the multiple-input processing module may determine at least two valid processing results from the at least two processing results, determine the processing result with the highest priority from the at least two valid processing results based on preset priority, and output the processing result with the highest priority to the bypass outputting subunit.

In practice, the processing result with the preset highest priority may be a processing result with earliest generation time. In addition, processing results outputted by different arithmetic and logic units may also have different priorities. The multiple-input processing module may compare priorities of arithmetic and logic units outputting processing results, and use a processing result outputted by an arithmetic and logic unit with a highest priority as the processing result with the highest priority. The priority of the arithmetic and logic unit may be determined using various approaches, for example, determined based on preset serial number of the arithmetic and logic unit.

Specifically, the processing result with the highest priority may be determined by executing a corresponding instruction on the multiple-input processing module. In addition, a priority configuration register may be provided in the multiple-input processing module to determine the processing result with the highest priority.

In some optional implementations of the present embodiment, the data processing subunit further includes a single-input processing module.

The number determining module is configured to output the at least two processing results to the single-input processing module if determining the number being one.

In these optional implementations, the number determining module outputs the at least two valid processing results to the single-input processing module if determining the number of processing results being one.

The single-input processing module is configured to determine a valid processing result from the at least two processing results, and output the valid processing result to the bypass outputting subunit.

In the present embodiment, the single-input processing module may determine a valid processing result based on enable signal level in the processing results, and output the valid processing result to the bypass outputting subunit.

In some optional application scenarios of these implementations, the single-input processing module and the multiple-input processing module include a multiple-stage multiplexer, and the multiple-stage multiplexer is configured to determine a valid processing result from the at least two processing results.

In these optional application scenarios, the single-input processing module may include a multi-stage multiplexer, and the multiple-input processing module may also include a multi-stage multiplexer.

Figure 2:
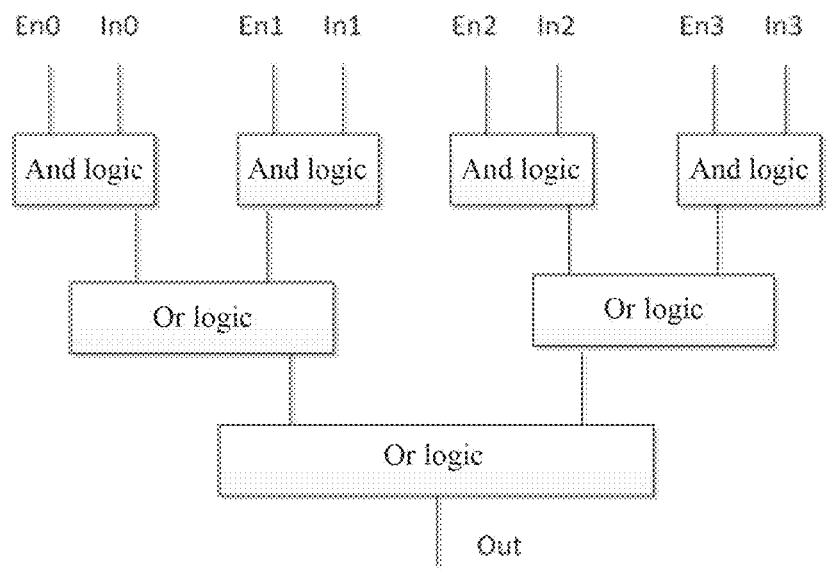
FIG. 2 is a schematic structural diagram of an embodiment of a circuit configuration of a single-input processing module according to the present disclosure.

As shown in FIG. 2, a circuit configuration of the single-input processing module may be as shown in the figure. A multiple-stage multiplexer may be provided in a sub-module of or logic, to determine a valid processing result from the at least two processing results. Output of the single-input processing module includes a set of En and In, such as En0 and In0.

The En and In in the figure are inputted processing results. The En is an enable signal, while the In is data outputted from the arithmetic and logic unit and obtained by the arithmetic logic unit from computation. The En and In having an identical number are corresponding. The description of the En and In also applies to FIG. 3.

Figure 3:
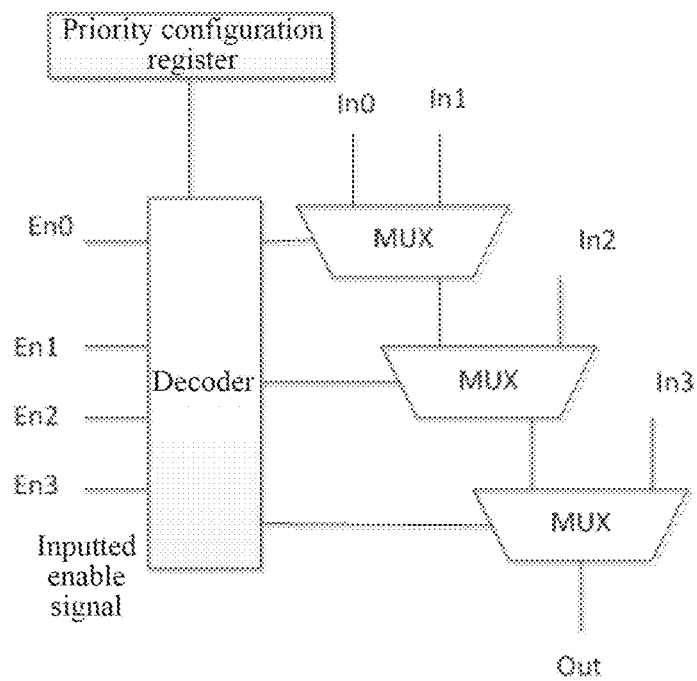
FIG. 3 is a schematic structural diagram of an embodiment of a circuit configuration of a multiple-input processing module according to the present disclosure.

As shown in FIG. 3, a circuit configuration of the multiple-input processing module may be as shown in the figure. A multi-stage multiplexer may be provided therein. Moreover, a decoder may also be provided to screen out at least two valid processing results. For example, when a priority configuration register is used, priorities of several input paths may be pre-configured. For example, the configuration includes: a configuration 1: In0>In1>In2>In3, and a configuration 2: In2>In3>In1>In0. The two configurations may both be preset in the decoder. One of the priority configurations may be determined by the priority configuration register. When the configuration 1 is used, if the In0 in the processing result and the In1 in the processing result are both valid, then In0 with a higher priority and an enable signal of the In0 may be selected. In these application scenarios, the multiple-input processing module may select processing results using different priorities, thereby providing more data processing schemes, and enhancing the flexibility of the processor.

In some optional implementations of the present embodiment, the number determining module is further configured to accumulatively add first level enable signals in the at least two processing results using an adder to obtain the number of first level enable signals, and determine the number of valid processing results based on the number of first level enable signals, where the first level is a high level or a low level.

In these optional implementations, the number determining module may accumulatively add high-level or low-level enable signals in the processing results using the adder to obtain the number of valid enable signals, and may pre-acquire which one of the high level and the low level is valid. If the high-level enable signals represent valid processing results, then the number of high-level enable signals is accumulatively added. If the low-level enable signals represent valid processing results, then the number of low-level enable signals is accumulatively added.

In practice, the number determining module may determine the number of enable signals as the number of processing results. In addition, the number determining module may further perform preset data processing, such as adding 1, on the number of enable signals, to obtain the number of processing results.

The present embodiment may give different selection schemes of processing results for different numbers of valid processing results by the multiple-input processing module and the single-input processing module. Thus, when the number is only one, a circuit configuration with small computational workload may be employed to improve the processing speed. When the number is large, a complex circuit configuration may be employed to obtain more accurate results.

Figure 4:
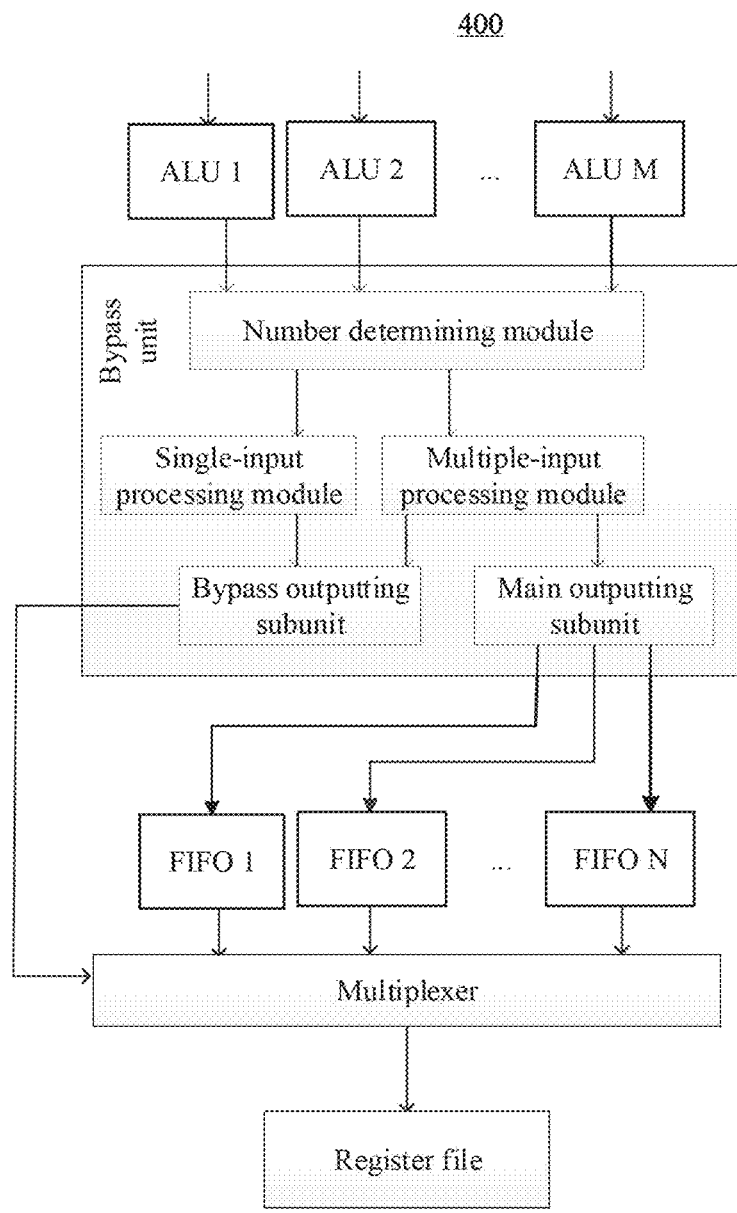
FIG. 4 is a schematic structural diagram of another embodiment of the processor according to the present disclosure.

Further referring to FIG. 4, as an implementation of the method shown in the above figures, a schematic diagram 400 of still another embodiment of the processor is shown.

The bypass unit further includes a main outputting subunit, and the queue unit includes a first in first out (FIFO) queue unit.

The multiple-input processing module is further configured to output other processing results except for the processing result with the highest priority among the at least two processing results to the main outputting subunit.

In the present embodiment, the multiple-input processing module may not only output the processing result with the highest priority to the bypass outputting subunit, but also output other processing results among the at least two processing results to the main outputting subunit.

The main outputting subunit is configured to output the other processing results to the first in first out queue unit.

In the present embodiment, the main outputting subunit may output the other processing results inputted from the multiple-input processing module to the first in first out queue unit. Specifically, a plurality of first in first out queue units may be provided, and the main outputting subunit may determine processing results to be outputted to the first in first out queue units from the other processing results. For example, each first in first out queue unit may have a corresponding hardware number, and the processing results may be sequentially distributed to the first in first out queue units based on hardware number. In addition, the processing results may also be randomly distributed to the first in first out queue units. The distribution sequence of the other processing results may be determined in accordance with the generation time sequence of the processing results, time sequence of inputting the processing results into the main outputting subunit, or the like.

The first in first out queue unit is configured to cache the other processing results, and output the other processing results to the multiplexer.

In the present embodiment, each first in first out queue unit may cache the received other processing results, and rank the received processing results in the first in first out queue. In accordance with the first in first out principle, the processing results are outputted to the multiplexer. The outputted processing results include the received other processing results.

In some optional implementations of the present embodiment, the multiplexer is further configured to sequentially output processing results outputted by the first in first out queue units and processing results outputted by the bypass outputting subunit to the register file, where a processing result outputted by the bypass outputting subunit from the multiplexer has the highest priority, and the processing results outputted by different first in first out queue units from the multiplexer have different priorities.

In these optional implementations, the multiplexer may sequentially output the processing results outputted by the first in first out queue units and the processing results outputted by the bypass outputting subunit to the register file. The output priority rule used in the sequentially outputting processing results is that the processing result outputted by the bypass outputting subunit from the multiplexer has the highest priority, and the processing results outputted by different first in first out queue units from the multiplexer have different priorities.

The priority of output from the multiplexer may be determined using various approaches. For example, a different priority may be preset for each first in first out queue unit, and a processing result outputted from a first in first out queue unit with a high priority may be preferentially outputted to the register file from the multiplexer. The hardware number of each first in first out queue unit may also be used as the priority of the first in first out queue unit. For example, the smaller is the number, the higher is the priority.

Further, as an implementation of the method shown in the above figures, the present disclosure presents a chip, including the processor in any of the above embodiments.

The present embodiment may reduce the caching process of processing results in the processor, and improve the processing efficiency of the chip by using a bypass unit. Moreover, the bypass unit is used to select a valid processing result, and reduce interference by invalid processing results, to facilitate subsequent utilization of the processing result.

Specifically, the chip may be an artificial intelligence chip, and selecting the processing result by the processor may efficiently improve the computation speed of the artificial intelligence chip.

Figure 5:
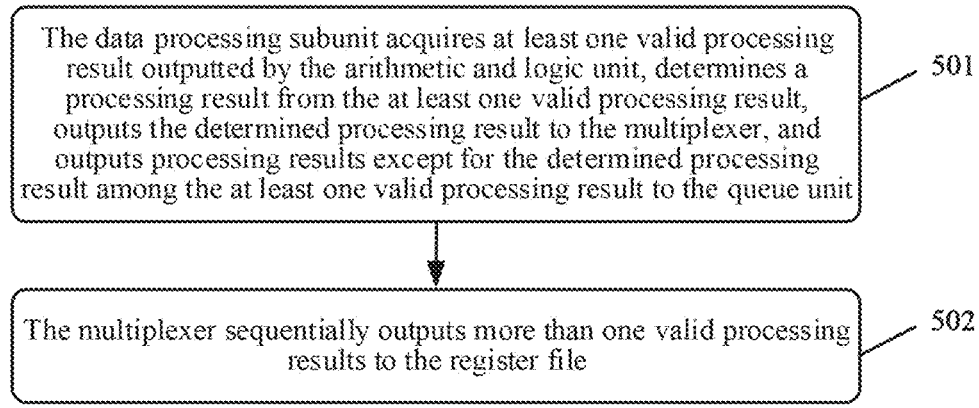
FIG. 5 is a flowchart of an embodiment of a method for processing information applied to a processor according to the present disclosure.

As shown in FIG. 5, the present disclosure further presents an embodiment 500 of a method for processing information applied to a processor. The processor includes an arithmetic and logic unit, a bypass unit, a queue unit, a multiplexer, and a register file. The bypass unit includes a data processing subunit. The method includes the following steps.

Step 501: the data processing subunit acquires at least one valid processing result outputted by the arithmetic and logic unit, determines a processing result from the at least one valid processing result, outputs the determined processing result to the multiplexer, and outputs processing results except for the determined processing result among the at least one valid processing result to the queue unit, where the processing result includes an enable signal, and the valid processing result includes a high-level enable signal or a low-level enable signal.

Step 502: the multiplexer sequentially outputs more than one valid processing results to the register file, where the more than one valid processing results include the determined processing result and a valid processing result outputted from the queue unit.

In some embodiments, the bypass unit further includes a bypass outputting subunit, and the data processing subunit includes a number determining module and a multiple-input processing module. The acquiring at least one valid processing result outputted by the arithmetic and logic unit, and determining a processing result from the at least one valid processing result includes: the number determining module determining the number of valid processing results among at least two processing results outputted by the arithmetic and logic unit within a clock cycle, and outputting the at least two processing results to the multiple-input processing module if it is determined that the number is more than two; and the multiple-input processing module, based on preset priority, determining at least two valid processing results from the at least two processing results, determining a processing result with a highest priority from the at least two valid processing results, and outputting the processing result with the highest priority to the bypass outputting subunit.

In some embodiments, the data processing subunit further includes a single-input processing module. The acquiring at least one valid processing result outputted by the arithmetic and logic unit, and determining a processing result from the at least one valid processing result further includes: the number determining module outputting the at least two processing results to the single-input processing module if it is determined that the number is one; and the single-input processing module determining a valid processing result from the at least two processing results, and outputting the valid processing result to the bypass outputting subunit.

In some embodiments, the bypass unit further includes a main outputting subunit, and the queue unit includes a first in first out queue unit. The method further includes: the multiple-input processing module outputting other processing results except for the processing result with the highest priority among the at least two valid processing results to the main outputting subunit; the main outputting subunit outputting the other processing results to the first in first out queue unit; and the first in first out queue unit caching the other processing results, and outputting the other processing results to the multiplexer.

In some embodiments, the sequentially outputting one or more valid processing results to the register file includes: the multiplexer sequentially outputting processing results outputted by the first in first out queue units and processing results outputted by the bypass outputting subunit to the register file, where a processing result outputted by the bypass outputting subunit from the multiplexer has the highest priority, and the processing results outputted by different first in first out queue units from the multiplexer have different priorities.

In some embodiments, the determining the number of valid processing results of at least two processing results outputted by the arithmetic and logic unit within a clock cycle includes: the number determining module accumulatively adding first level enable signals in the at least two processing results using an adder to obtain the number of first level enable signals, and determining the number of valid processing results based on the number of first level enable signals, where the first level is a high level or a low level.

In some embodiments, the single-input processing module and the multiple-input processing module include a multiple-stage multiplexer, and the multiple-stage multiplexer is configured to determine a valid processing result from at least two processing results.

The present embodiment may reduce the caching process of processing results in the processor, and improve the processing efficiency of the processor by using the bypass unit. Moreover, the bypass unit is used to select a valid processing result, and reduce interference by invalid processing results, to facilitate subsequent utilization of the processing result.

Figure 6:
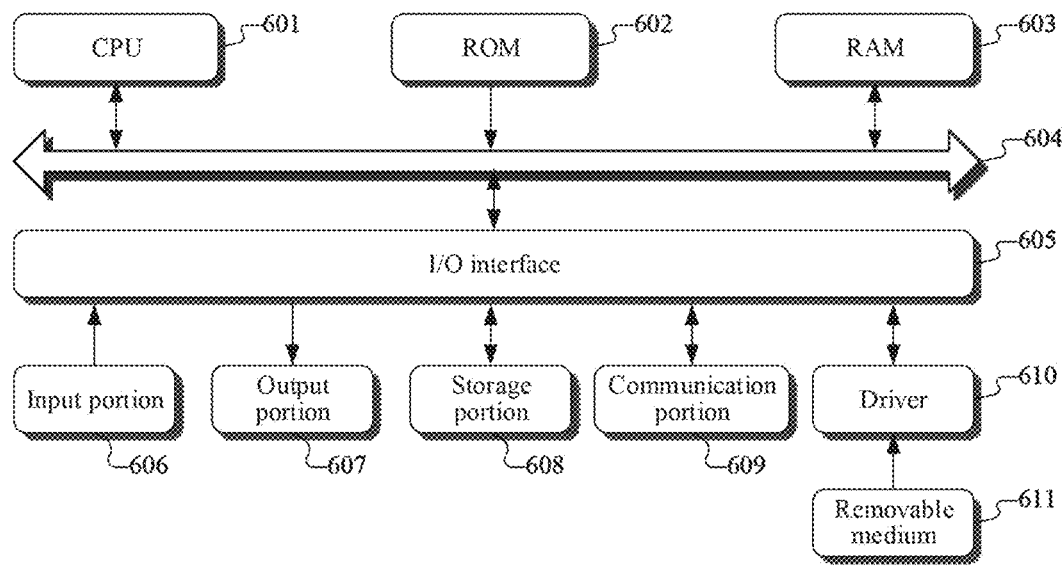
FIG. 6 is a schematic structural diagram of a computer system adapted to implement an electronic device of the embodiments of the present disclosure.

Referring to FIG. 6 below, a schematic structural diagram of a computer system 600 adapted to implement an electronic device of embodiments of the present disclosure is shown. The electronic device shown in FIG. 6 is merely an example, and should not limit the functions and scope of use of the embodiments of the present disclosure.

As shown in FIG. 6, the computer system 600 includes a central processing unit (CPU and/or GPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The central processing unit 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, so that a computer program read therefrom is installed on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit 601, implements the above functions as defined by the method of the present disclosure. It should be noted that the computer readable medium of the present disclosure may be a computer readable signal medium or a computer readable storage medium or any combination of the above two. An example of the computer readable storage medium may include, but is not limited to: an electric, magnetic, optical, electromagnetic, infrared, or semiconductor system, apparatus, element, or a combination of any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory or any suitable combination of the above. In the present disclosure, the computer readable storage medium may be any tangible medium containing or storing programs, which may be used by a command execution system, apparatus or element, or incorporated thereto. In the present disclosure, the computer readable signal medium may include a data signal in the base band or propagating as a part of a carrier wave, in which computer readable program codes are carried. The propagating data signal may take various forms, including but not limited to: an electromagnetic signal, an optical signal or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should also be noted that each block in the block diagrams and/or flow charts as well as a combination of blocks in the block diagrams and/or flow charts may be implemented using a special purpose hardware-based system executing specified functions or operations, or by a combination of special purpose hardware and computer instructions.

In another aspect, the present disclosure further provides a computer readable medium. The computer readable medium may be included in the apparatus in the above described embodiments, or a stand-alone computer readable medium without being assembled into the apparatus. The computer readable medium stores one or more programs. When executed by the apparatus, the one or more programs cause, in the apparatus: a data processing subunit to acquire at least one valid processing result outputted by an arithmetic and logic unit, determine a processing result from the at least one valid processing result, output the determined processing result to a multiplexer, and output processing results except for the determined processing result among the at least one valid processing result to a queue unit, where the processing result includes an enable signal, and the valid processing result includes a high-level enable signal or a low-level enable signal; and the multiplexer to sequentially output more than one valid processing results to a register file, where the more than one valid processing results include the determined processing result and a valid processing result outputted from the queue unit.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A processor, comprising an arithmetic and logic unit, a bypass unit, a queue unit, a multiplexer, and a register file, the bypass unit comprising a data processing subunit;
   wherein the data processing subunit is configured to acquire at least one valid processing result outputted by the arithmetic and logic unit, determine a processing result from the at least one valid processing result, output the determined processing result to the multiplexer, and output other processing results except for the determined processing result among the at least one valid processing result to the queue unit, the processing result comprising an enable signal, the valid processing result comprising a high-level enable signal or a low-level enable signal; and
   the multiplexer is configured to sequentially output more than one valid processing results to the register file, the more than one valid processing results comprising the determined processing result outputted from the data processing subunit of the bypass unit and a valid processing result outputted from the queue unit;
   wherein the bypass unit further comprises a bypass outputting subunit configured to output data to the multiplexer, and the data processing subunit of the bypass unit comprises a number determining module and a multiple-input processing module;

the number determining module is configured to determine a number of valid processing results among at least two processing results outputted by the arithmetic and logic unit within a clock cycle, and output the at least two processing results to the multiple-input processing module in response to determining that the number of the valid processing results is more than two; and
   the multiple-input processing module is configured to determine at least two valid processing results from the least two processing results, determine one processing result with a highest priority from the at least two valid processing results based on preset priority, and output the processing result with the highest priority to the bypass outputting subunit.

2. The processor according to claim 1, wherein the data processing subunit further comprises a single-input processing module;
   the number determining module is further configured to output the at least two processing results to the single-input processing module in response to determining that the number of the valid processing results is one; and
   the single-input processing module is configured to determine a valid processing result from the at least two processing results, and output the valid processing result to the bypass outputting subunit.

3. The processor according to claim 1, wherein the bypass unit further comprises a main outputting subunit, and the queue unit comprises a first in first out queue unit;
   the multiple-input processing module is further configured to output other processing results except for the processing result with the highest priority among the at least two valid processing results to the main outputting subunit;
   the main outputting subunit is configured to output the other processing results to the first in first out queue unit; and
   the first in first out queue unit is configured to cache the other processing results, and output the other processing results to the multiplexer.

4. The processor according to claim 3, wherein the multiplexer is further configured to sequentially output processing results outputted by the first in first out queue units and processing results outputted by the bypass outputting subunit to the register file, wherein a processing result outputted by the bypass outputting subunit from the multiplexer has a highest priority, and processing results outputted by different first in first out queue units from the multiplexer have different priorities.

5. The processor according to claim 1, wherein the number determining module is further configured to accumulatively add first level enable signals in the at least two processing results using an adder to obtain a number of first level enable signals, and determine a number of valid processing results based on the number of first level enable signals, wherein the first level is a high level or a low level.

6. The processor according to claim 2, wherein the single-input processing module and the multiple-input processing module comprise a multiple-stage multiplexer, and the multiple-stage multiplexer is configured to determine a valid processing result from the at least two processing results.

7. A chip, comprising the processor according to claim 1.

8. A method for processing information applied to a processor, the processor comprising an arithmetic and logic unit, a bypass unit, a queue unit, a multiplexer, and a register file, the bypass unit comprising a data processing subunit; the method comprising:
- acquiring, by the data processing subunit, at least one valid processing result outputted by the arithmetic and logic unit, determining a processing result from the at least one valid processing result, outputting the determined processing result to the multiplexer, and outputting other processing results except for the determined processing result of among the at least one valid processing result to the queue unit, the processing result comprising an enable signal, the valid processing result comprising a high-level enable signal or a low-level enable signal; and
- sequentially outputting, by the multiplexer, more than one valid processing results to the register file, the more than one valid processing results comprising the determined processing result outputted from the data processing subunit of the bypass unit and a valid processing result outputted from the queue unit;
- wherein the bypass unit further comprises a bypass outputting subunit configured to output data to the multiplexer, and the data processing subunit of the bypass unit comprises a number determining module and a multiple-input processing module; and
- the acquiring at least one valid processing result outputted by the arithmetic and unit, and determining a processing result from the at least one valid processing result comprises:
  - determining, by the number determining module, a number of valid processing results among at least two processing results outputted by the arithmetic and logic unit within a clock cycle, and outputting the at least two processing results to the multiple-input processing module in response to determining that the number of the valid processing results is more than two; and
  - determining, by the multiple-input processing module, at least two valid processing results from the at least two processing results, determining one processing result with a highest priority from the at least two valid processing results based on preset priority, and outputting the processing result with the highest priority to the bypass outputting subunit.

9. The method according to claim 8, wherein the data processing subunit further comprises a single-input processing module; and
- the acquiring at least one valid processing result outputted by the arithmetic and logic unit, and determining a processing result from the at least one valid processing result further comprises:
  - outputting, by the number determining module, the at least two processing results to the single-input processing module in response to determining that the number of the valid processing results is one; and
  - determining, by the single-input processing module, a valid processing result from the at least two processing results, and outputting the valid processing result to the bypass outputting subunit.

10. The method according to claim 8, wherein the bypass unit further comprises a main outputting subunit, and the queue unit comprises a first in first out queue unit; and
- the method further comprises:
  - outputting, by the multiple-input processing module, other processing results except for the processing result with the highest priority among the at least two valid processing results to the main outputting subunit;
  - outputting, by the main outputting subunit, the other processing results to the first in first out queue unit; and
  - caching, by the first in first out queue unit, the other processing results, and outputting the other processing results to the multiplexer.

11. The method according to claim 10, wherein the sequentially outputting more than one valid processing results to the register file comprises:
- sequentially outputting, by the multiplexer, processing results outputted by the first in first out queue units and processing results outputted by the bypass outputting subunit to the register file, wherein a processing result outputted by the bypass outputting subunit from the multiplexer has a highest priority, and the processing results outputted by different first in first out queue units from the multiplexer have different priorities.

12. The method according to claim 8, wherein the determining a number of valid processing results among at least two processing results outputted by the arithmetic and logic unit within a clock cycle comprises:
- accumulatively adding, by the number determining module, first level enable signals in the at least two processing results using an adder to obtain a number of first level enable signals, and determining a number of valid processing results based on the number of first level enable signals, wherein the first level is a high level or a low level.

13. The method according to claim 9, wherein the single-input processing module and the multiple-input processing module comprise a multiple-stage multiplexer, and the multiple-stage multiplexer is configured to determine a valid processing result from the at least two processing results.

14. An electronic device, comprising:
- one or more processors; and
- a storage apparatus, configured to store one or more programs,
- wherein the one or more programs, when executed by the one or more processors, cause the one or more processors to implement the method according to claim 8.

15. A non-transitory computer readable storage medium, storing a computer program thereon, wherein the program, when executed by a processor, implements the method according to claim 8.

* * * * *

UNITED STATES PATENT AND TRADEMARK OFFICE
CERTIFICATE OF CORRECTION

PATENT NO. : 11,055,100 B2  
APPLICATION NO. : 16/502628  
DATED : July 6, 2021  
INVENTOR(S) : Jian Ouyang Page 1 of 1

It is certified that error appears in the above-identified patent and that said Letters Patent is hereby corrected as shown below:

In the Claims

Column 14, Line 2, Claim 1, after "results" insert -- of --

Column 14, Line 10, Claim 1, after "from the" insert -- at --

Column 15, Line 30, Claim 8, after "and" insert -- logic -- (first occurrence).

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*